UNITED STATES PATENT OFFICE.

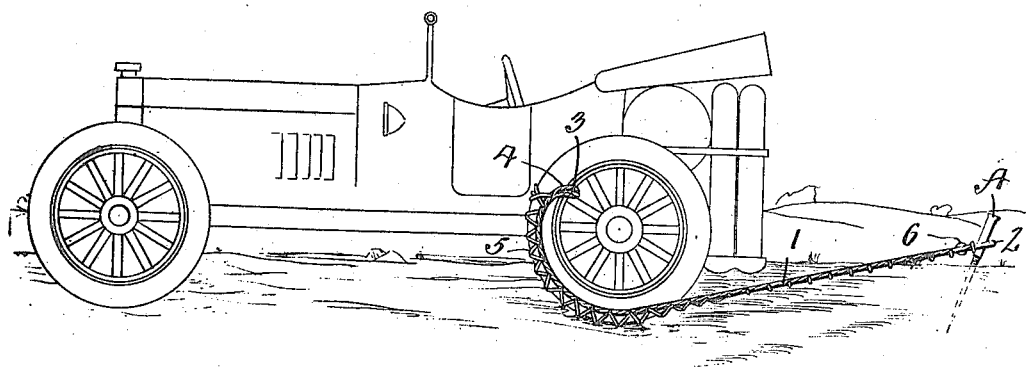
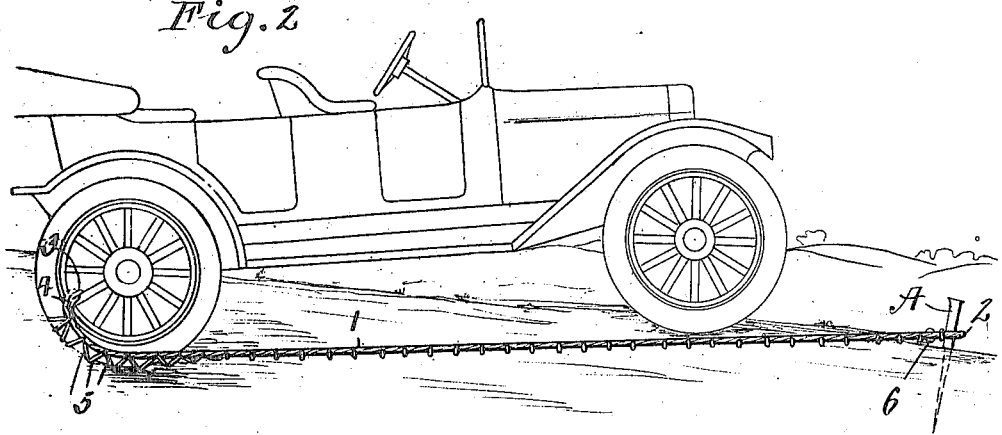
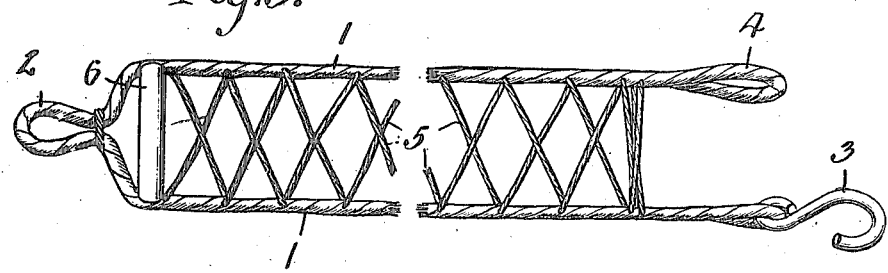

ALEXANDER GAGNON, OF BIDDEFORD, MAINE.

AUTOMOBILE-EXTRICATING DEVICE.

1,180,127.

Specification of Letters Patent.

Patented Apr. 18, 1916.

Application filed May 24, 1915. Serial No. 30,142.

*To all whom it may concern:*

Be it known that I, ALEXANDER GAGNON, a citizen of the United States, residing at Biddeford, in the county of York and State of Maine, have invented new and useful Improvements in Automobile-Extricating Devices, of which the following is a specification.

This invention relates to automobile extricating devices, the object in view being to provide a simple device adapted to be readily carried in an automobile and stowed away under the seat or placed in the tool box, said device being adapted to enable the operator of a car to extricate the machine from a soft or miry place under the power of the machine itself and without the assistance of another machine or additional help.

With the above and other objects in view, the invention consists in the novel construction, combination and arrangement of parts, as herein described, illustrated and claimed.

In the accompanying drawings:—Figure 1 is a side elevation showing one method of using the extricating device. Fig. 2 is a similar view showing another method of using the extricating device. Fig. 3 is a plan view on an enlarged scale of the device *per se*. Fig. 4 is a detail view of the sectional stake.

The device of this invention embodies two flexible tension members 1 extending in the same general direction, each of said members consisting either of an ordinary rope or cable and both of the members being brought together at one end to form an eye 2 which constitutes the stationary end of the device, said eye 2 being adapted to be placed over a stake indicated generally at A and comprising one or more sections. Where the stake consists of one or more sections, the sections thereof may be threaded or otherwise coupled together as indicated in Fig. 4. This stake is tapered and pointed so as to facilitate driving the same into solid ground at a sufficiently remote point from the place where the machine is mired to enable said machine to be propelled under its own power upon the more solid ground.

One of the tension members 1 has attached to one end thereof a hook 3 while the other member 1 is provided with an eye 4 to receive said hook. This enables the end of the device provided with said hook to be engaged with one of the driving wheels of the machine by extending the device around one of the spokes immediately adjacent to the wheel rim.

A plurality of smaller flexible strands 5 extending generally in the length of the whole device connect the tension members 1, being reeved back and forth through said tension members, there being preferably two of such flexible strands so reeved through the tension members as to form series of obliquely extending and crossing tire gripping members which embrace the tread portion of the tire when linear strain is placed on the whole device.

6 designates a spreader which is removably inserted between the tension members 1 adjacent to the eye 2 above referred to, said spreading member serving to hold the adjacent ends of the tension members at a sufficient distance apart to accommodate the tire and rim of the automobile.

In the use of the device hereinabove described, one end thereof is engaged with the wheel in the manner described and as illustrated, for example, in Fig. 1 where the machine is to be backed out of the place in which it is mired, the other end of the device being anchored by means of the stake A driven into the ground. Where the operator desires to extricate the machine by driving the same in a forward direction, the device is used as illustrated in Fig. 2, one end thereof being fastened to one of the driving wheels of the machine and the other end being carried forward and secured by the anchoring stake to the ground. The device is thus applicable for extricating the machine from a mired position by driving the machine either in a forward or backward direction.

When the device is not in use it may be compactly rolled and stored away in any convenient place in the machine, the same being true with respect to the stake A which as above stated may be of sectional construction to facilitate its storage and transportation.

What I claim is:—

An automobile extricating device, embodying a pair of flexible tension members extending in the same general direction and connected together at one end in the form of a terminal eye, a hook enabling the opposite ends of said tension members to be connected and disconnected, a plurality of flexible strands of smaller size extending throughout the length of said tension members and reeved back and forth through said tension members and forming two series of obliquely extending and crossing tire gripping members, and a detachable spreading member insertible between the tension members adjacent to said terminal eye.

In testinomy whereof I affix my signature in presence of two witnesses.

ALEXANDER GAGNON.

Witnesses:
 AMY M. PIER,
 JAMES W. WOOD.